US011431506B2

(12) United States Patent
Ballard et al.

(10) Patent No.: US 11,431,506 B2
(45) Date of Patent: Aug. 30, 2022

(54) SYSTEM AND METHOD OF UTILIZING A COMPONENT OF AN INFORMATION HANDLING SYSTEM

(71) Applicant: Dell Products L.P., Round Rock, TX (US)

(72) Inventors: Lee Eric Ballard, Georgetown, TX (US); Jonathan Foster Lewis, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 238 days.

(21) Appl. No.: 16/999,495

(22) Filed: Aug. 21, 2020

(65) Prior Publication Data
US 2022/0060339 A1 Feb. 24, 2022

(51) Int. Cl.
H04L 9/32 (2006.01)
G06F 13/16 (2006.01)
H04L 9/06 (2006.01)
H04L 9/30 (2006.01)
G06F 21/60 (2013.01)
G06F 13/42 (2006.01)
H04L 9/08 (2006.01)

(52) U.S. Cl.
CPC ........ *H04L 9/3247* (2013.01); *G06F 13/1668* (2013.01); *G06F 13/4282* (2013.01); *G06F 21/602* (2013.01); *H04L 9/0643* (2013.01); *H04L 9/0825* (2013.01); *H04L 9/30* (2013.01); *G06F 2213/0026* (2013.01)

(58) Field of Classification Search
CPC ... H04L 9/3247; H04L 9/0643; H04L 9/0825; H04L 9/30; G06F 13/1668; G06F 13/4282; G06F 21/602; G06F 2213/0026; G06F 13/387; G06F 13/4027; G06F 21/572; G06F 2213/0016
See application file for complete search history.

(56) References Cited

U.S. PATENT DOCUMENTS

2018/0165455 A1* 6/2018 Liguori ................. G06F 21/575
2020/0257460 A1* 8/2020 Som ..................... G06F 3/0623

* cited by examiner

*Primary Examiner* — David E Martinez
(74) *Attorney, Agent, or Firm* — Baker Botts, L.L.P.

(57) ABSTRACT

In one or more embodiments, one or more systems, one or more methods, and/or one or more processes may determine, via a baseboard management controller (BMC) of an information handling system, to provide firmware to a component of the information handling system; may provide, via the BMC, first data to the component via a first bus; based at least on the first data, may provide, via a communications bridge of the component, a first signal to a non-volatile memory medium (NVMM) of the component, a multiplexer of the component, and an integrated circuit of the component, in which the first signal causes the integrated circuit to be held in a reset state, causes a write protection of the NVMM to be cleared, and causes the multiplexer to couple the BMC to the NVMM; and may provide, via the BMC, the firmware to the NVMM via the multiplexer.

20 Claims, 10 Drawing Sheets

FIG. 3B       FIG. 3C

SYSTEM AND METHOD OF UTILIZING A COMPONENT OF AN INFORMATION HANDLING SYSTEM

BACKGROUND

Field of the Disclosure

This disclosure relates generally to information handling systems and more particularly to utilizing a component of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may determine, via a baseboard management controller (BMC) of an information handling system, to provide firmware to a component of the information handling system; may provide, via the BMC, first data to the component via a first bus; based at least on the first data, may provide, via a communications bridge of the component, a first signal to a non-volatile memory medium of the component, a multiplexer of the component, and an integrated circuit of the component, in which the first signal may cause the integrated circuit to be held in a reset state, may cause a write protection of the non-volatile memory medium of the component to be cleared, and may cause the multiplexer of the component to couple the BMC to the non-volatile memory medium; may provide, via the BMC, the firmware to the non-volatile memory medium via the multiplexer; may store, via the non-volatile memory medium, the firmware; may provide, via the BMC, second data to the component via the first bus; based at least on the second data, may provide, via the communications bridge, a second signal to the non-volatile memory medium, the multiplexer, and the integrated circuit, in which the second signal may cause the integrated circuit to be released from the reset state, may cause the write protection of the non-volatile memory medium to be instated, and may cause the multiplexer to couple the non-volatile memory medium to the integrated circuit; and may execute, via the integrated circuit, the firmware.

In one or more embodiments, the one or more systems, the one or more methods, and/or the one or more processes may further, after the information handling system boots, provide, via the BMC, third data to the component via the first bus; based at least on the third data, may further provide, via the communications bridge, a third signal to the non-volatile memory medium, the multiplexer, and the integrated circuit, in which the third signal may cause the integrated circuit to be held in the reset state, may cause the write protection of the non-volatile memory medium to be cleared, and may cause the multiplexer to couple the BMC to the non-volatile memory medium; may further receive, via the BMC, the firmware from the non-volatile memory medium; may further determine, via the BMC, a first hash value of the firmware; may further decrypt, via the BMC, a signature associated with the firmware to obtain a second hash value; and may further determine, via the BMC, that the first hash value matches the second hash value.

In one or more embodiments, decrypting the signature associated with the firmware to obtain the second hash value may include decrypting the signature with a public encryption key. For example, the BMC may obtain the public encryption key from a certificate. For instance, the certificate may be signed by a certificate authority. In one or more embodiments, the communications bridge may be coupled to the first bus and may be coupled to a second bus. In one example, the first bus may utilize a first protocol. In another example, the second bus may utilize a second protocol, different from the first protocol. In one instance, the first bus may include an inter-integrated circuit bus. In another instance, the second bus may include a serial peripheral interface bus. In one or more embodiments, the multiplexor may be coupled to the second bus. In one or more embodiments, a Peripheral Component Interconnect Express coupling may include the first bus.

In one or more embodiments, a component may be configured to be installed in an information handling system. For example, the component may include: a communications bridge that may be configured to be coupled to a first bus of the information handling system; a non-volatile memory medium; an integrated circuit; and a multiplexer, coupled to the communications bridge, the non-volatile memory medium, and the integrated circuit.

In one or more embodiments, the communications bridge may be further configured to: receive first data via the first bus; based at least on the first data, provide a first signal to the non-volatile memory medium, the multiplexer, and the integrated circuit, in which the first signal may cause the integrated circuit to be held in a reset state, may cause a write protection of the non-volatile memory medium to be cleared, and may cause the multiplexer to couple the communications bridge to the non-volatile memory medium; receive, via the first bus, firmware for the integrated circuit; provide the firmware to the non-volatile memory medium; receive second data via the first bus; and based at least on the second data, provide a second signal to the non-volatile memory medium, the multiplexer, and the integrated circuit, in which the second signal may cause the integrated circuit to be released from the reset state, may cause the write protection of the non-volatile memory medium to be instated, and may cause the multiplexer to couple the non-volatile memory medium to the integrated circuit. In one or more embodiments, the integrated circuit may be configured to execute the firmware.

In one or more embodiments, the component may further include a second bus. For example, the second bus may couple the communications bridge to the multiplexer. In one instance, the first bus may utilize a first protocol. In another instance, the second bus may utilize a second protocol, different from the first protocol. The first bus may include an inter-integrated circuit bus. The second bus may include a serial peripheral interface bus. In one or more embodiments, the component may be a Peripheral Component Interconnect Express component. For example, the Peripheral Component Interconnect Express component may be coupled to the information handling system via a Peripheral Component Interconnect Express coupling. For instance, the Peripheral Component Interconnect Express coupling may include the first bus.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIG. 3B illustrates an example of a baseboard management controller communicatively coupled to a component via a peripheral component interconnect express coupling, according to one or more embodiments;

FIG. 3C illustrates an example of a baseboard management controller providing firmware to a component, according to one or more embodiments;

DETAILED DESCRIPTION

Figure 1A:
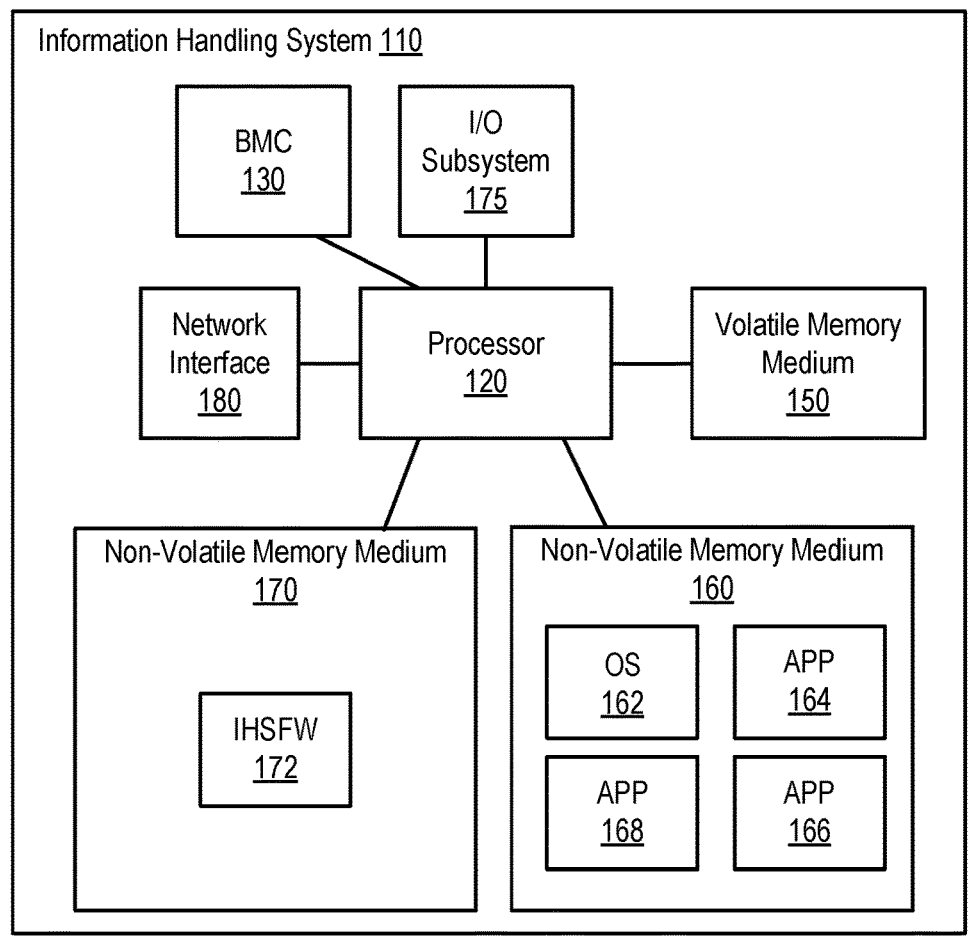
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system may include one or more of hardware, firmware, and software that may prevent attacks against one or more components of the information handling system. In one example, a component of the information handling system may include a processor, a baseboard management controller, a volatile memory medium, a non-volatile memory medium, or a network interface, among others. In another example, a component of the information handling system may include firmware. For instance, an attack (e.g., a hacking attempt) may target the firmware of a component. In one or more embodiments, one or more integrated circuits (ICs) of a component may not include one or more security measures. For example, the one or more ICs of the component may not determine if firmware for the component has been tampered with and/or compromised. For instance, it may not be possible to add one or more security measures to the one or more ICs of the component to determine if firmware for the component has been tampered with and/or compromised.

In one or more embodiments, one or more additional ICs may be added to the component of the information handling system, which may prevent a firmware attack to succeed. For example, utilizing the one or more additional ICs, it may be determined if the firmware for the component has been compromised. In one or more embodiments, a hardware root of trust (HWRoT) may be leveraged to utilize the one or more additional ICs, which may prevent a firmware attack to succeed. For example, the one or more additional ICs and cryptographic capabilities of a baseboard management controller may prevent a firmware attack to succeed.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I$^2$C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a baseboard management controller (BMC) 130, a volatile memory medium 150, non-volatile memory media 160 and 170, an I/O subsystem 175, and a network interface 180. As illustrated, volatile BMC 130, memory medium 150, non-volatile memory media 160 and 170, I/O subsystem 175, and network interface 180 may be communicatively coupled to processor 120.

In one or more embodiments, one or more of BMC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, volatile memory medium 150, non-volatile memory media 160 and 170, I/O subsystem 175, and network interface 180 may be communicatively coupled to processor 120 via one or more PCI-Express (PCIe) root complexes. In another example, one or more of BMC 130, I/O subsystem 175, and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

Figure 1B:
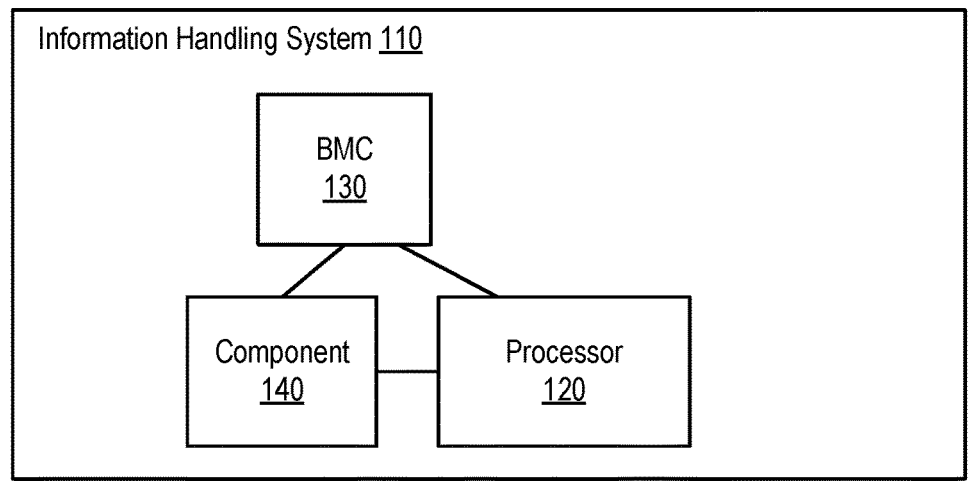
FIG. 1B illustrates another example of an information handling system, according to one or more embodiments.

Turning now to FIG. 1B, another example of an information handling system is illustrated, according to one or more embodiments. As shown, IHS 110 may include a component 140. As illustrated, a component 140 may be coupled to processor 120. As shown, component 140 may be coupled to BMC 130. In one or more embodiments, BMC 130 may validate firmware of component 140. For example, BMC 130 may validate the firmware of component 140 to determine that the firmware of component 140 has not been compromised. In one or more embodiments, may install firmware to component 140.

Figure 2:
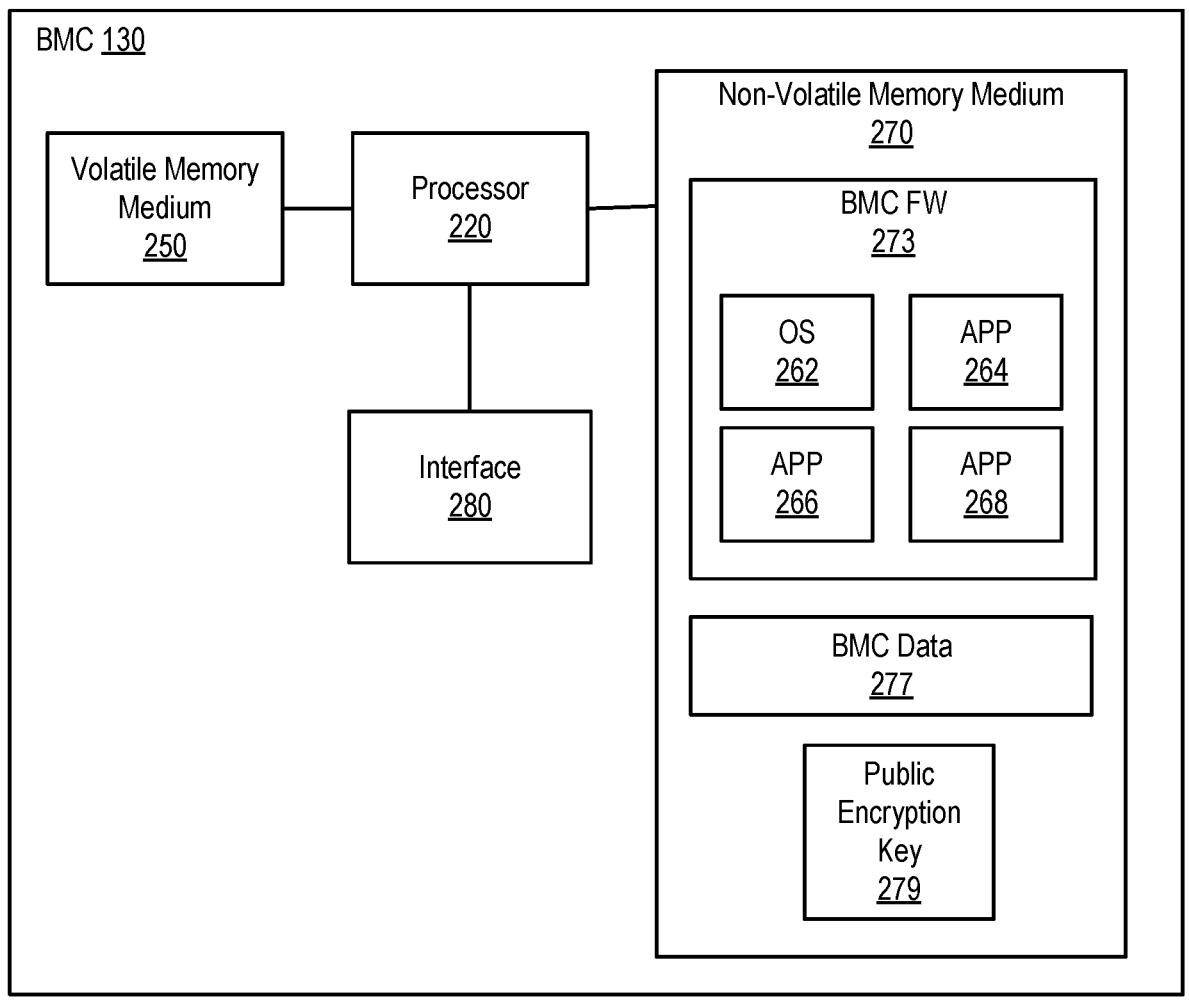
FIG. 2 illustrates an example of a baseboard management controller, according to one or more embodiments.

Turning now to FIG. 2, an example of a baseboard management controller is illustrated, according to one or more embodiments. As shown, BMC 130 may include a processor 220, a volatile memory medium 250, a non-volatile memory medium 270, and an interface 280. As illustrated, non-volatile memory medium 270 may include a BMC firmware (FW) 273, which may include an OS 262 and APPs 264-268, and may include BMC data 277. In one example, OS 262 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 262 may be or include an Unix-like operating system. For instance, the Unix-like operating system may be or include LINUX®, FREEBSD®, NETBSD®, OpenBSD, Minix, Xinu, or Darwin, among others. In another example, OS 262 may be or include a portable operating system interface (POSIX) compliant operating system. As illustrated, non-volatile memory medium 270 may include a public encryption key 279. In one or more embodiments, a private encryption key may be associated with public encryption key 279. For example, the private encryption key and public encryption key 279 may be asymmetric encryption keys. In one instance, data encrypted via the private encryption key may be decrypted via public encryption key 279. In another instance, data encrypted via public encryption key 279 may be decrypted via the private encryption key.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable BMC 130 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

Figure 3A:
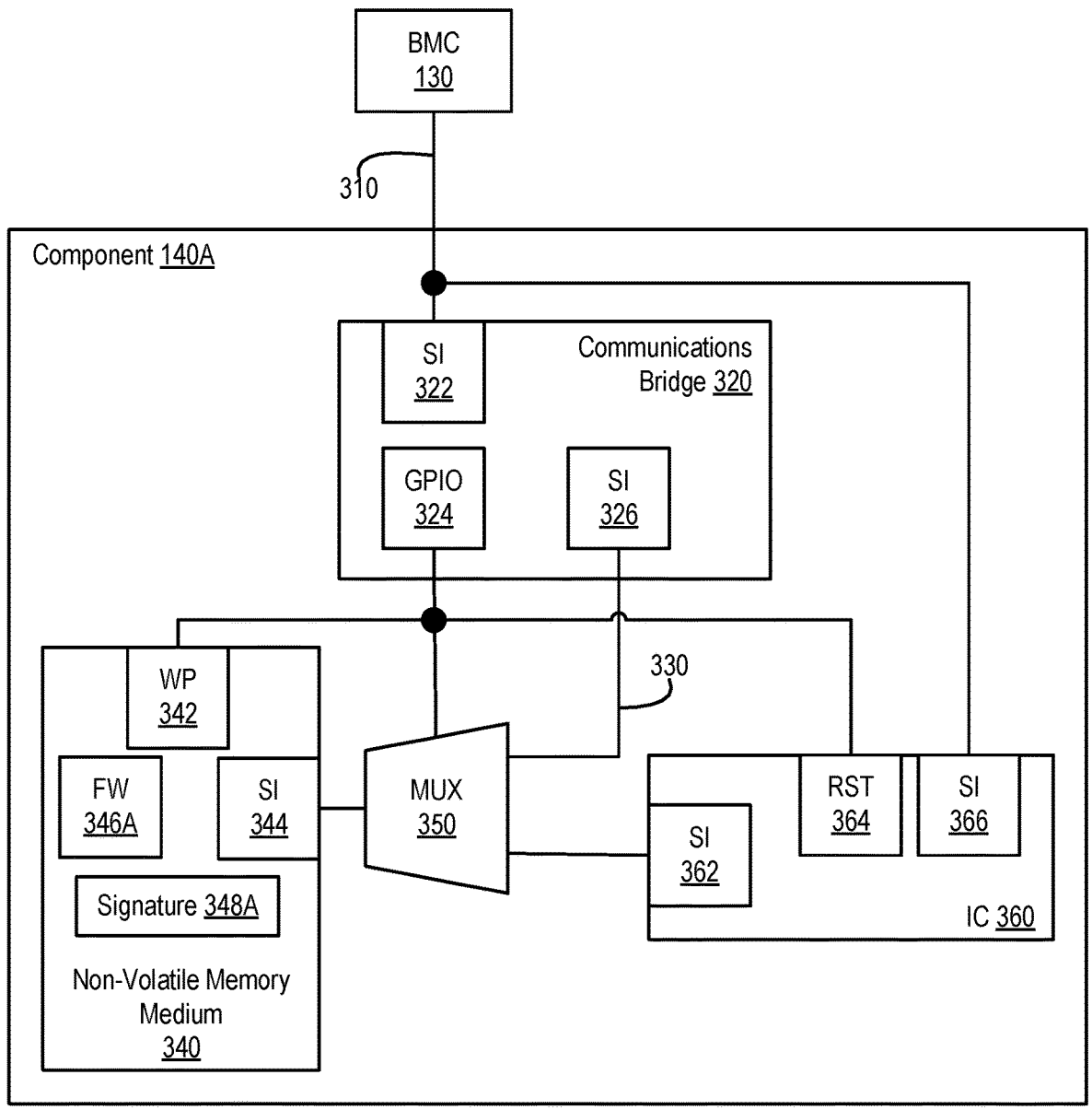
FIG. 3A illustrates an example of a component configured to be utilized by an information handling system, according to one or more embodiments.

Turning now to FIG. 3A, an example of a component configured to be utilized by an information handling system is illustrated, according to one or more embodiments. As shown, a component 140A may include a communications bridge 320. As illustrated, component 140A may include a non-volatile memory medium 340. As shown, component 140A may include a multiplexer (MUX) 350. In one or more embodiments, MUX 350 may be a hardware MUX. For example, MUX 350 may be implemented in hardware. As illustrated, component 140A may include an integrated circuit (IC) 360. In one or more embodiments, component 140A may be a component of IHS 110. As an example, component 140A may include a network interface. For instance, component 140A may include network interface 180. As an example, IC 360 may include a Broadcom BCM5719, a Broadcom BCM5720, or an Intel I350, among others.

As illustrated, communications bridge 320 may include a serial interface (SI) 322. As shown, communications bridge 320 may include a GPIO interface 322. As illustrated, communications bridge 320 may include a SI 326. As shown, BMC 130 may be coupled to SI 322. For example, BMC 130 may be coupled component 140A via a serial bus 310. In one instance, BMC 130 may be coupled component 140A via SI 322. In another instance, BMC 130 may be coupled component 140A via interface 280 (illustrated in FIG. 2). In one or more embodiments, a component 140 and BMC 130 may be coupled via a PCIe coupling 370, as illustrated in FIG. 3B. For example, PCIe coupling 370 may include serial bus 310. For instance, serial bus 310 may include an fc bus.

Referring again to FIG. 3A, as shown, non-volatile memory medium 340 may include a write protect (WP) interface 342. As illustrated, non-volatile memory medium 340 may include a SI 344. As shown, non-volatile memory medium 340 may include firmware (FW) 346A. For example, non-volatile memory medium 340 may store FW 346A. As shown, non-volatile memory medium 340 may include signature 348A. For example, non-volatile memory medium 340 may store signature 348A. For instance, signature 348A may be a signature of FW 346A. Although not specifically illustrated, BMC 130 may store a signature 348, according to one or more embodiments. As shown, IC 360 may include a SI 362. As shown, IC 360 may include a reset (RST) interface 364. As illustrated, IC 360 may include a SI 366. As shown, SI 366 may be coupled to SI 322. In one or more embodiments, IC 360 may include one or more of an ASIC, a processor, and a FPGA, among others.

As illustrated, GPIO interface 324 may be coupled to WP interface 342, MUX 350, and reset interface 364. In one or more embodiments, GPIO interface 324 may assert one or more of a logical true and a logical false to WP interface 342, MUX 350, and reset interface 364. For example, communications bridge 320 may receive data from BMC 130 and may assert, via GPIO interface 324, one or more of the logical true and the logical false to WP interface 342, MUX 350, and reset interface 364 based at least on the data from BMC 130.

As shown, SI 326 may be coupled to MUX 350. For example, SI 326 may be coupled to MUX 350 via a bus 330. In one or more embodiments, bus 310 may utilize a first protocol, and bus 330 may utilize a second protocol, different from the first protocol. For example, communications bridge 320 may converter data from the first protocol to data of the second protocol. In one instance, bus 310 may include I²C bus. In another instance, bus 330 may include a SPI bus. As an example, communications bridge 320 may converter data from an I²C protocol to data of a SPI protocol. For instance, communications bridge 320 receive firmware 346 via the I²C protocol and may provide firmware 346 via the SPI protocol.

As illustrated, MUX 350 may be coupled to non-volatile memory medium 340 and to IC 360. In one example, MUX 350 may be coupled to non-volatile memory medium 340 via SI 344. In another example, MUX 350 may be coupled to IC 360 via SI 362. In one or more embodiments, MUX 350 may provide data from communications bridge 320 to non-volatile memory medium 340 based on the logical true from communications bridge 320 (e.g., from GPIO interface 324 of communications bridge 320). For example, non-volatile memory medium 340 may store the data from communications bridge 320 via FW 346.

In one or more embodiments, MUX 350 may provide data from non-volatile memory medium 340 to communications bridge 320 based on the logical true from communications bridge 320 (e.g., from GPIO interface 324 of communications bridge 320). For example, non-volatile memory medium 340 may provide FW 346 to communications bridge 320. For instance, communications bridge 320 may provide FW 346 to BMC 130. As an example, communications bridge 320 may provide FW 346 to BMC 130 via bus 310.

In one or more embodiments, MUX 350 may provide data from non-volatile memory medium 340 to IC 360 based on the logical false signal from communications bridge 320 (e.g., from GPIO interface 324 of communications bridge 320). For example, IC 360 may load FW 346A. In one or more embodiments, serial interfaces 326, 344, and 362 may be compliant with a SPI bus. In one or more embodiments, communications bridge 320 may converter data from the second protocol to data of the first protocol. In one example, bus 310 may include fc bus. In another example, bus 330 may include a SPI bus. As an example, communications bridge 320 may converter data from a SPI protocol to data of an I²C protocol. For instance, communications bridge 320 receive firmware 346 via the SPI protocol and may provide firmware 346 via the I²C protocol.

Figure 3D:
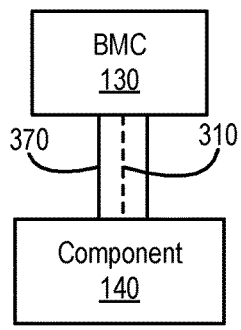
FIG. 3D illustrates a second example of a component configured to be utilized by an information handling system, according to one or more embodiments.
Figure 3D:
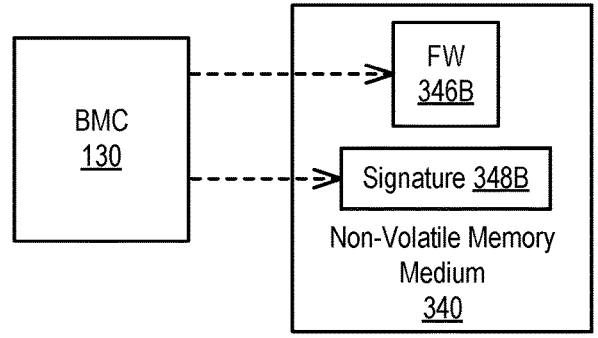
Figure 3D:
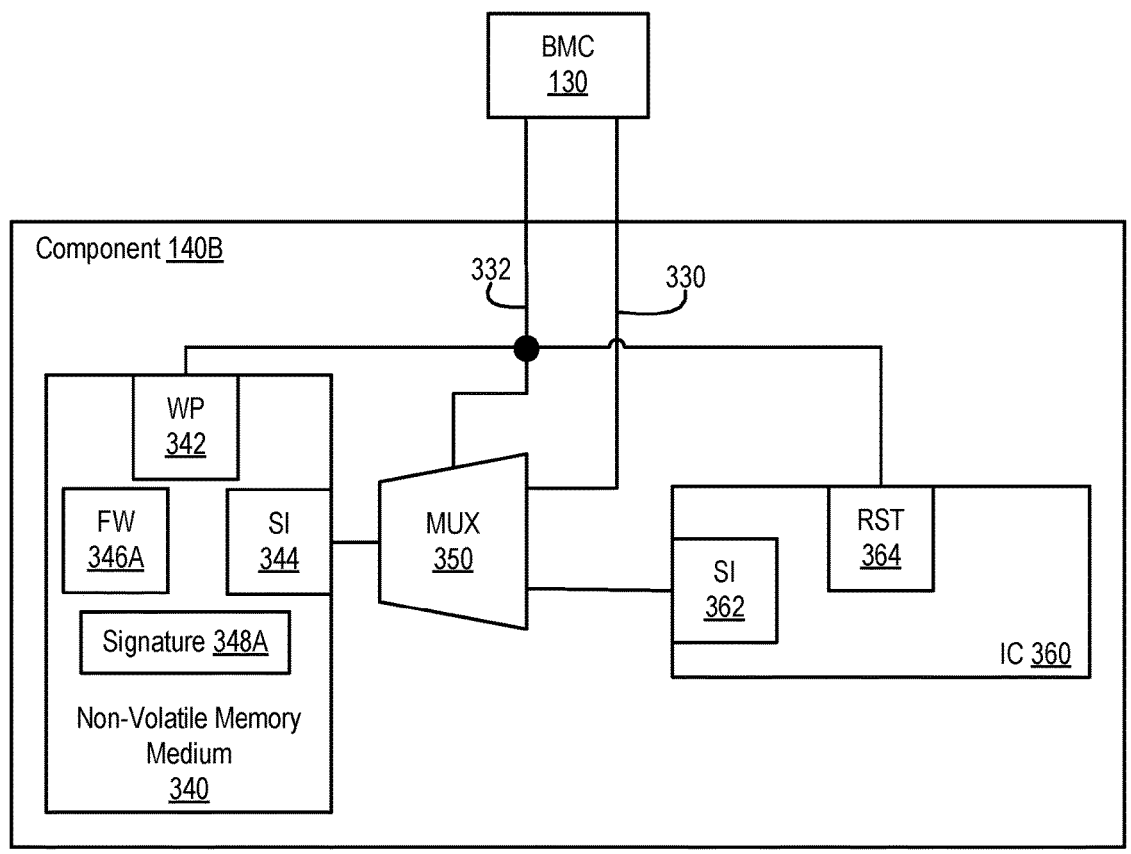

Turning now to FIG. 3D, a second example of a component configured to be utilized by an information handling system is illustrated, according to one or more embodiments. As shown, a component 140B may not include communications bridge 320. In one or more embodiments, component 140B may be implemented without communications bridge 320. As illustrated, component 140B may include non-volatile memory medium 340. As shown, component 140B may include MUX 350. In one or more embodiments, MUX 350 may be a hardware MUX. For example, MUX 350 may be implemented in hardware. In one or more embodiments, MUX 350 may be a logical MUX. For example, the logical MUX may be implemented via one or more properties of a bus, which is described in further detail with reference to FIG. 3E. As illustrated, component 140B may include IC 360. In one or more embodiments, component 140B may be a component of IHS 110. As an example, component 140B may include a network interface. For instance, component 140B may include network interface 180. As an example, IC 360 may include a Broadcom BCM5719, a Broadcom BCM5720, or an Intel 1350, among others.

As illustrated, BMC 130 may be coupled to MUX 350. In one example, BMC 130 may be coupled component 140B via serial bus 330. For instance, BMC 130 may be coupled component 140B via serial bus 330. In another example, BMC 130 may be coupled component 140B via a GPIO coupling 332. For instance, BMC 130 may control MUX 350 via GPIO coupling 332. In one or more embodiments, interface 280 of BMC 130 may be coupled to GPIO coupling 332.

As illustrated, GPIO coupling 332 may be coupled to WP interface 342, MUX 350, and reset interface 364. In one or more embodiments, GPIO coupling 332 may assert one or more of a logical true and a logical false to WP interface 342, MUX 350, and reset interface 364. For example, BMC 130 may assert, via GPIO coupling 332, one or more of the logical true and the logical false to WP interface 342, MUX 350, and reset interface 364.

As shown, bus 330 may be coupled to MUX 350. For example, bus 330 may include a SPI bus. For example, interface 280 of BMC 130 may be compliant with a SPI bus. For instance, interface 280 of BMC 130 may be coupled to bus 330. As illustrated, MUX 350 may be coupled to non-volatile memory medium 340 and to IC 360. In one example, MUX 350 may be coupled to non-volatile memory medium 340 via SI 344. In another example, MUX 350 may be coupled to IC 360 via SI 362. In one or more embodiments, MUX 350 may provide data from BMC 130 to non-volatile memory medium 340 based on the logical true from BMC 130 (e.g., via GPIO coupling 332). For example, non-volatile memory medium 340 may store the data from BMC 130 via FW 346.

In one or more embodiments, MUX 350 may provide data from non-volatile memory medium 340 to BMC 130 based on the logical true from BMC 130 (e.g., via GPIO coupling 332). For example, bus 330 may provide FW 346 to BMC 130. In one or more embodiments, MUX 350 may provide data from non-volatile memory medium 340 to IC 360 based on the logical false signal from BMC 130 (e.g., via GPIO coupling 332). For example, IC 360 may load FW 346A. In one or more embodiments, serial interfaces 344 and 362 may be compliant with a SPI bus.

Figure 3E:
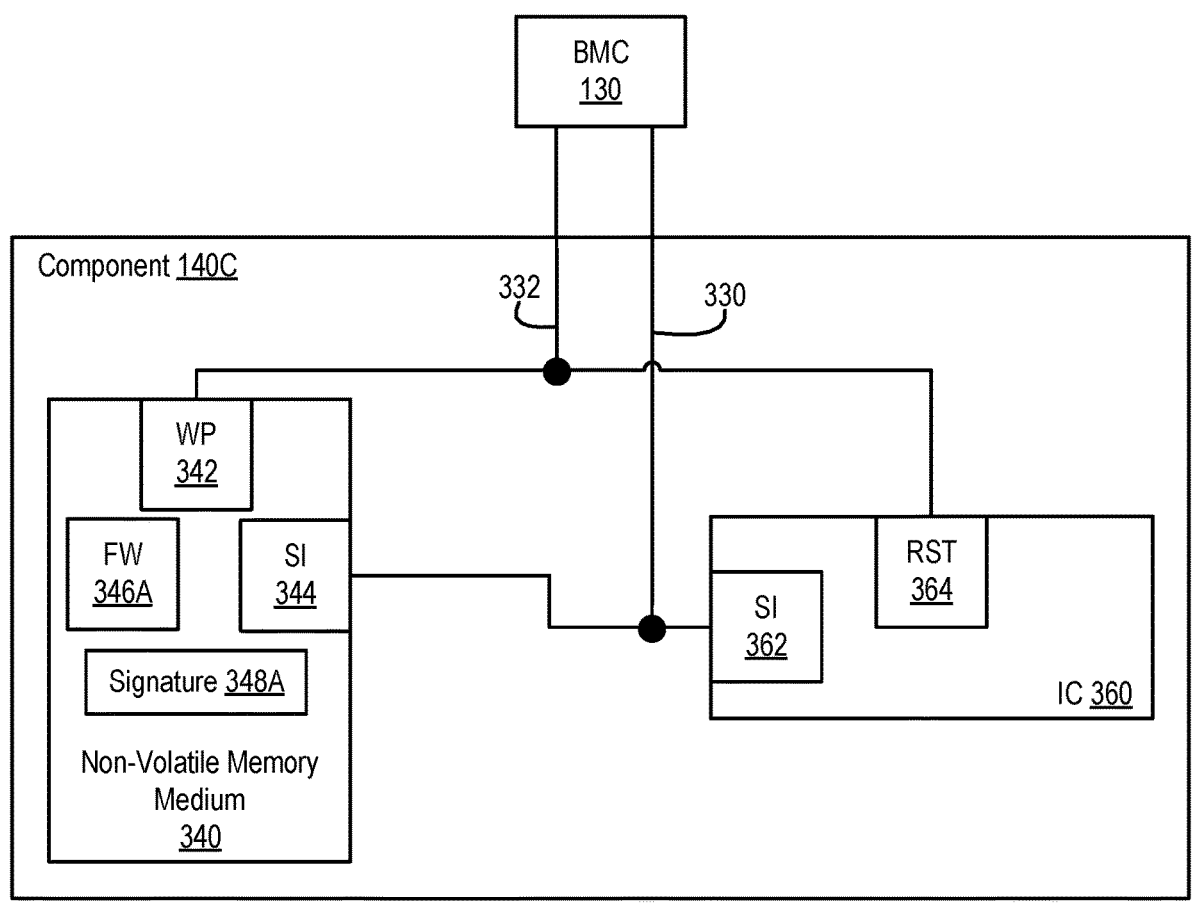
FIG. 3E illustrates another example of a component configured to be utilized by an information handling system, according to one or more embodiments.

Turning now to FIG. 3E, another example of a component configured to be utilized by an information handling system is illustrated, according to one or more embodiments. As shown, a component 140C may not include communications bridge 320. In one or more embodiments, component 140C may be implemented without communications bridge 320. As illustrated, component 140C may include non-volatile memory medium 340. As shown, component 140C may not physically include MUX 350. For example, MUX 350 may be implemented via one or more properties of a bus. For instance, MUX 350 may be implemented via one or more properties of bus 330. As illustrated, component 140C may include IC 360. In one or more embodiments, component 140C may be a component of IHS 110. As an example, component 140C may include a network interface. For instance, component 140C may include network interface 180. As an example, IC 360 may include a Broadcom BCM5719, a Broadcom BCM5720, or an Intel I350, among others.

As illustrated, BMC 130 may be coupled to non-volatile memory medium 340. In one example, BMC 130 may be coupled component 140C via serial bus 330. For instance, BMC 130 may be coupled component 140C via serial bus 330. In another example, BMC 130 may be coupled component 140C via a GPIO coupling 332. In one or more embodiments, interface 280 of BMC 130 may be coupled to GPIO coupling 332.

As illustrated, GPIO coupling 332 may be coupled to WP interface 342 and reset interface 364. In one or more embodiments, GPIO coupling 332 may assert one or more of a logical true and a logical false to WP interface 342 and reset interface 364. For example, BMC 130 may assert, via GPIO coupling 332, one or more of the logical true and the logical false to WP interface 342 and reset interface 364.

As shown, bus 330 may be coupled to non-volatile memory medium 340 and IC 360. In one or more embodiments, bus 330 may include a SPI bus. For example, interface 280 of BMC 130 may be compliant with a SPI bus. For instance, interface 280 of BMC 130 may be coupled to bus 330. In one or more embodiments, bus 330 may provide data from BMC 130 to non-volatile memory medium 340. For example, non-volatile memory medium 340 may store the data from BMC 130 via FW 346.

In one or more embodiments, bus 330 may provide data from non-volatile memory medium 340 to BMC 130. For example, bus 330 may provide FW 346 to BMC 130. In one or more embodiments, bus 330 may provide data from non-volatile memory medium 340 to IC 360. For example, IC 360 may load FW 346A. In one or more embodiments, serial interfaces 344 and 362 may be compliant with a SPI bus.

Figure 4A:
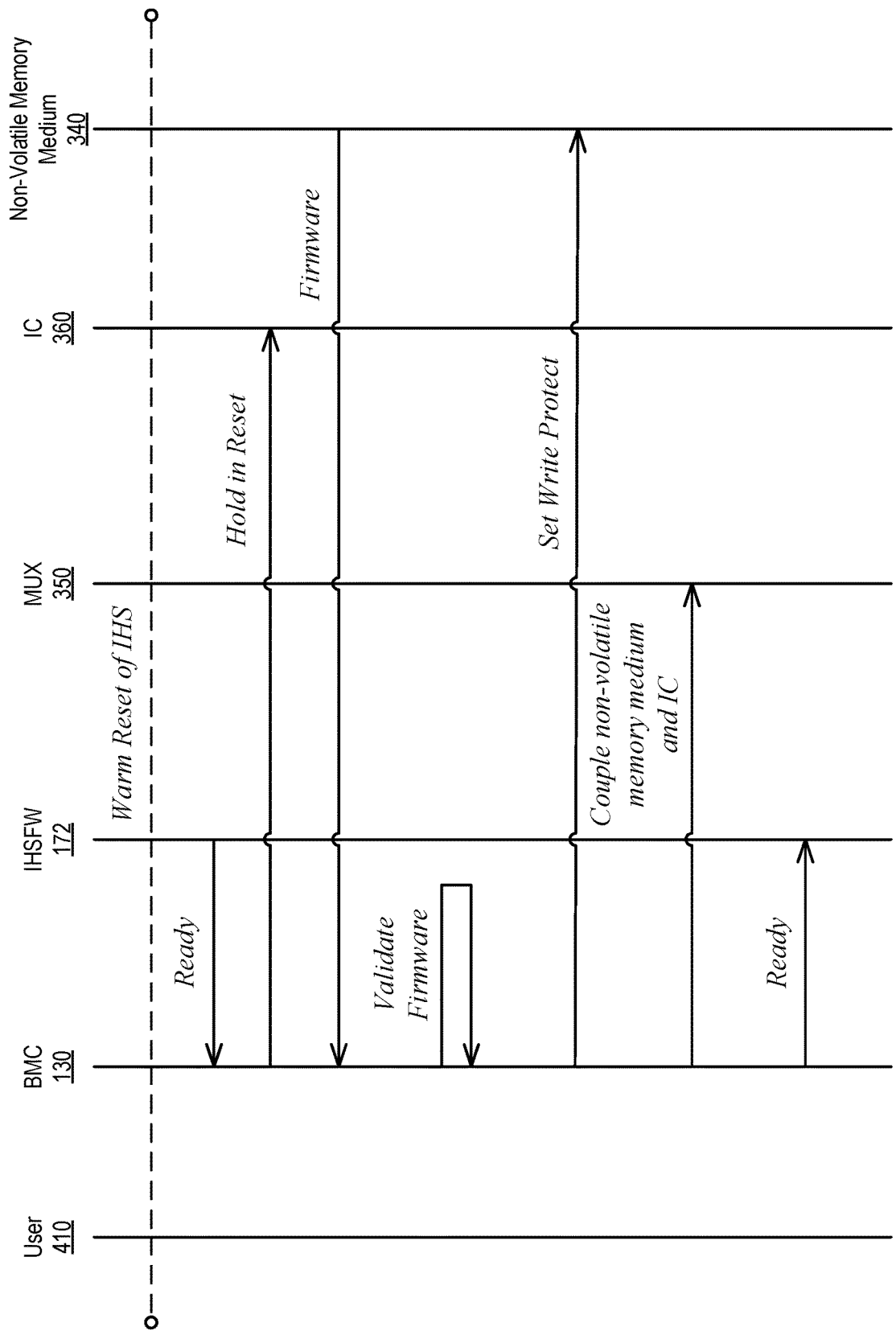
FIGS. 4A and 4B illustrate an example of a sequence diagram of operating an information handling system, according to one or more embodiments.
Figure 4B:
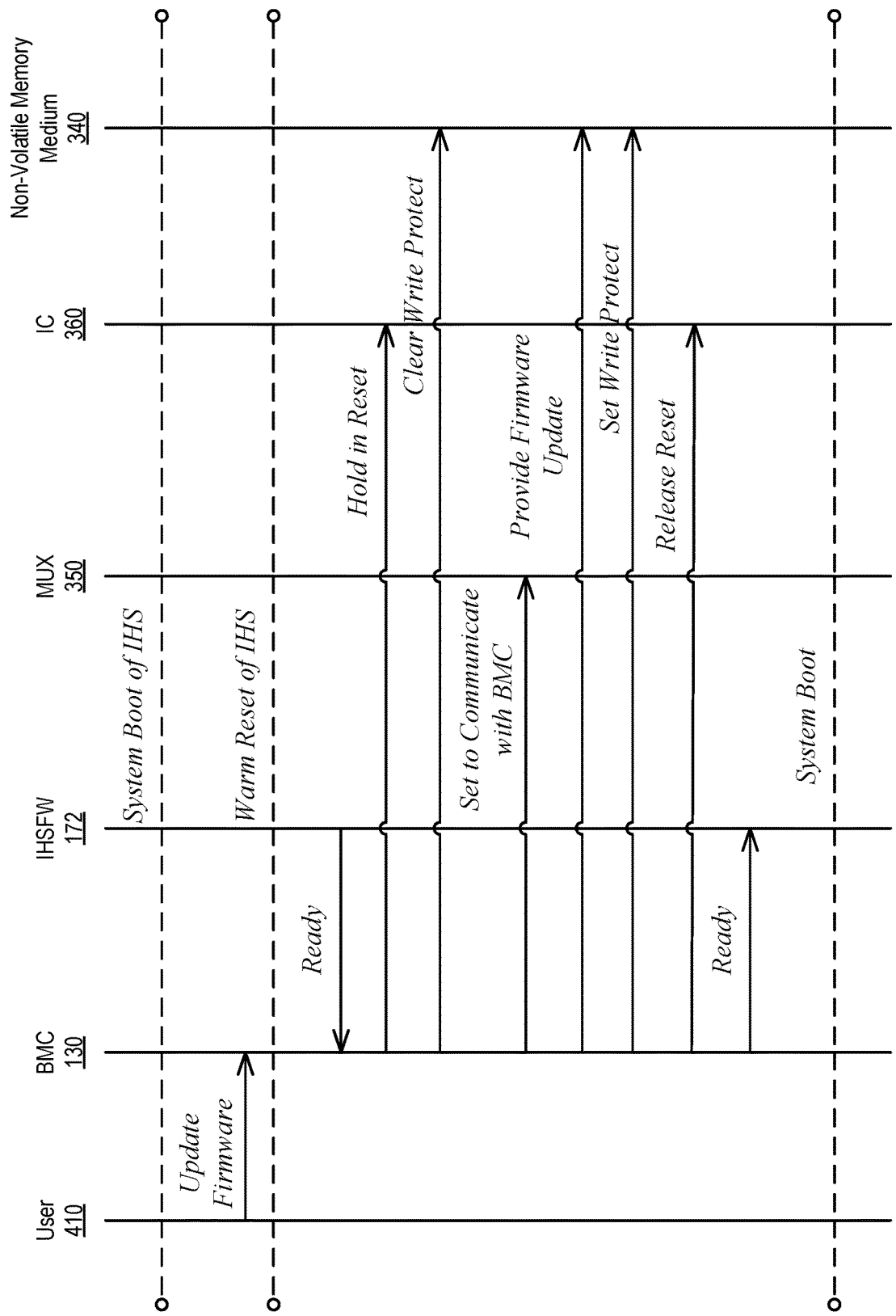

Turning now to FIGS. 4A and 4B, an example of a sequence diagram of operating an information handling system is illustrated, according to one or more embodiments. As shown, after a warm reset of IHS 110, IHSFW 172 may provide a ready signal to BMC 130. BMC 130 may hold IC 360 in reset. In one or more embodiments, holding IC 360 in reset may include providing first data to component 140. For example, communications bridge 320 may receive the first data. Based at least on the first data, communications bridge 320 may provide, via GPIO 324, a first signal to non-volatile memory medium 340, MUX 350, and IC 360. In one or more embodiments, the first signal may cause IC 360 to be held in a reset state, may cause a write protection of non-volatile memory medium 340 to be cleared, and may cause MUX 350 to couple BMC 130 to non-volatile memory medium 340. In one or more embodiments, holding IC 360 in reset may include BMC 130 providing a signal to GPIO coupling 332. For example, BMC 130 may provide the first signal to GPIO coupling 332. For instance, the first signal may cause IC 360 to be held in a reset state, may cause a write protection of non-volatile memory medium 340 to be cleared, and may cause MUX 350 to couple BMC 130 to non-volatile memory medium 340.

As illustrated, BMC 130 may receive FW 346 from non-volatile memory medium 340. As shown, BMC 130 may validate FW 346. In one or more embodiments, BMC 130 may utilize the method illustrated in FIG. 7 to validate FW 346. As illustrated, BMC 130 may set the write protection of non-volatile memory medium 340. As shown, BMC 130 may configure MUX 350 to couple non-volatile memory medium 340 and IC 360.

In one or more embodiments, BMC 130 may provide second data to component 140. For example, communications bridge 320 may receive the second data. Based at least on the second data, communications bridge 320 may provide, via GPIO 324, a second signal to non-volatile memory medium 340, MUX 350, and IC 360. In one or more embodiments, the second signal may cause IC 360 to be released from the reset state, may cause the write protection of non-volatile memory medium 340 to be set, and may cause MUX 350 to couple non-volatile memory medium 340 to IC 360. In one or more embodiments, releasing IC 360 from reset may include BMC 130 providing a signal to GPIO coupling 332. For example, BMC 130 may provide the second signal to GPIO coupling 332. For instance, the second signal may cause IC 360 to be released from the reset state, may cause the write protection of non-volatile memory medium 340 to be set, and may cause MUX 350 to couple non-volatile memory medium 340 to IC 360.

As illustrated, BMC 130 may provide a ready signal to IHSFW 172. As shown, after a system boot of IHS 110, a user 410 may instruct BMC 130 to update the firmware of component 140. As illustrated, after a warm reset of IHS 110, IHSFW 172 may provide a ready signal to BMC 130. BMC 130 may hold IC 360 in reset. In one or more embodiments, holding IC 360 in reset may include providing third data to component 140. For example, communications bridge 320 may receive the third data. Based at least on the third data, communications bridge 320 may provide, via GPIO 324, the first signal to non-volatile memory medium 340, MUX 350, and IC 360. In one or more embodiments, the first signal may cause IC 360 to be held in the reset state, may cause the write protection of non-volatile memory medium 340 to be cleared, and may cause MUX 350 to couple BMC 130 to non-volatile memory medium 340. In one or more embodiments, holding IC 360 in reset may include BMC 130 providing a signal to GPIO coupling 332. For example, BMC 130 may provide the first signal to GPIO coupling 332. For instance, the first signal may cause IC 360 to be held in the reset state, may cause the write protection of non-volatile memory medium 340 to be cleared, and may cause MUX 350 to couple BMC 130 to non-volatile memory medium 340.

As shown, BMC 130 may provide a firmware update to non-volatile memory medium 340. For example, as illustrated in FIG. 3C, BMC 130 may provide firmware 346B to non-volatile memory medium 340. For instance, BMC 130 may provide signature 348B to non-volatile memory medium 340. In one or more embodiments, BMC 130 may provide firmware 346B and/or signature 348B to nonvolatile memory medium 340 via one or more of bus 310, communications bridge 320, bus 330, and MUX 350, among others.

In one or more embodiments, BMC 130 may provide fourth data to component 140. For example, communications bridge 320 may receive the fourth data. Based at least on the fourth data, communications bridge 320 may provide, via GPIO 324, the second signal to non-volatile memory medium 340, MUX 350, and IC 360. In one or more embodiments, the second signal may cause IC 360 to be released from the reset state, may cause the write protection of non-volatile memory medium 340 to be set, and may cause MUX 350 to couple non-volatile memory medium 340 to IC 360. In one or more embodiments, releasing IC 360 from reset may include BMC 130 providing a signal to GPIO coupling 332. For example, BMC 130 may provide the second signal to GPIO coupling 332. For instance, the second signal may cause IC 360 to be released from the reset state, may cause the write protection of non-volatile memory medium 340 to be set, and may cause MUX 350 to couple non-volatile memory medium 340 to IC 360. As shown, BMC 130 may provide a ready signal to IHSFW 172. As illustrated, a system boot of IHS 110 may occur.

Figure 5:
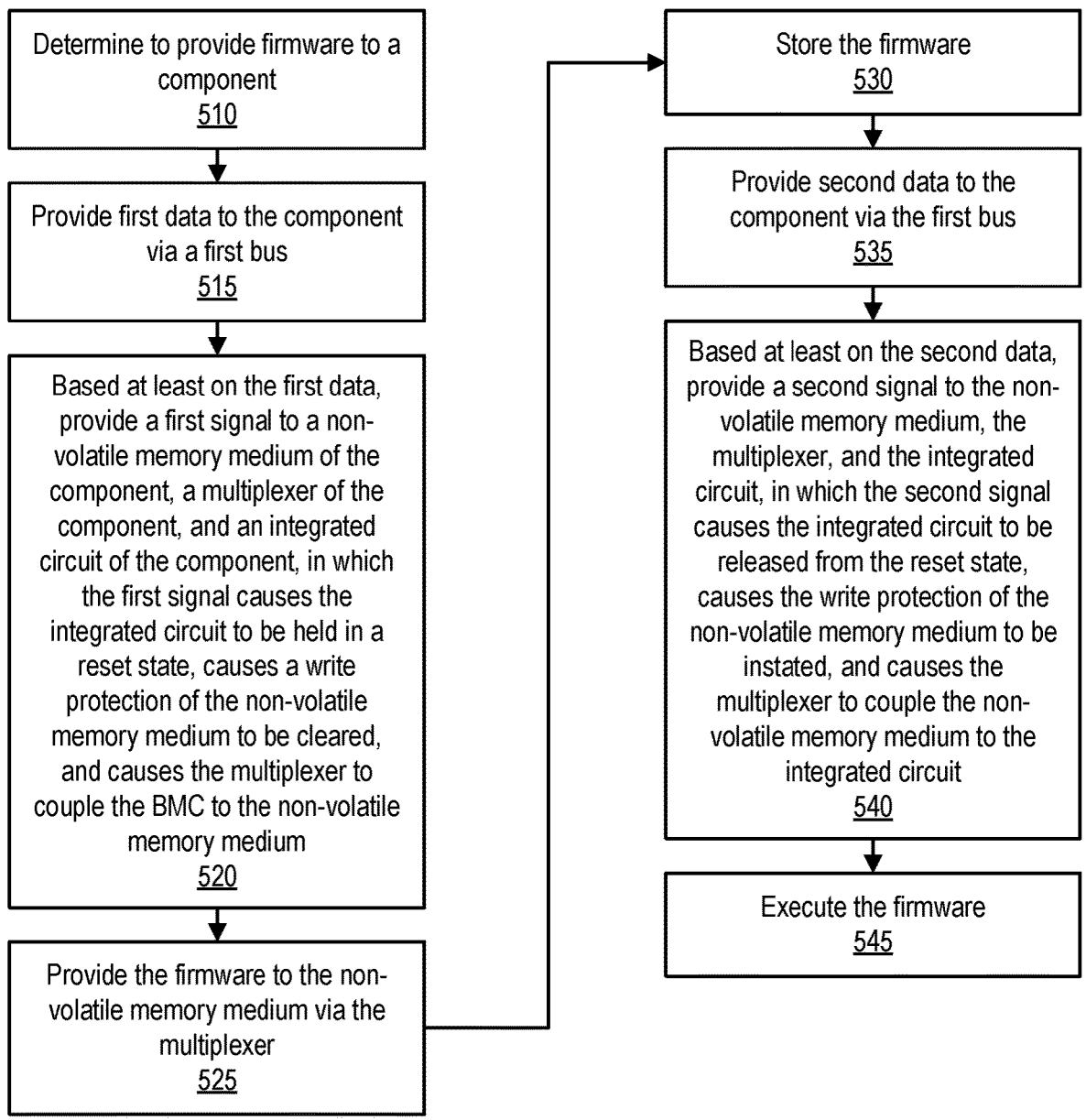
FIG. 5 illustrates an example of a method of operating an information handling system, according to one or more embodiments.

Turning now to FIG. 5, an example of a method of utilizing a component of an information handling system is illustrated, according to one or more embodiments. At 510, it may be determined to provide firmware to a component. For example, BMC 130 may determine to provide firmware to component 140. For instance, BMC 130 may determine to provide firmware to component 140 based at least on user input from user 410.

At 515, first data may be provided to the component via a first bus. For example, BMC 130 may provide first data to component 140 via bus 310. At 520, based at least on the first data, a first signal may be provided to a non-volatile memory medium of the component, a multiplexer of the component, and an integrated circuit of the component, in which the first signal may cause the integrated circuit to be held in a reset state, may cause a write protection of the non-volatile memory medium to be cleared, and may cause the multiplexer to couple the BMC to the non-volatile memory medium. For example, based at least on the first data, bridge 320 may provide a first signal to non-volatile memory medium 340, multiplexer 340, and IC 360, in which the first signal may cause IC 360 to be held in a reset state, may cause a write protection of non-volatile memory medium 340 to be cleared, and may cause multiplexer 350 to couple BMC 130 to non-volatile memory medium 340.

At 525, the firmware may be provided to the non-volatile memory medium via the multiplexer. For example, BMC 130 may provide firmware 346B to non-volatile memory medium 340 via multiplexer 350. At 530, the firmware may be stored via the non-volatile memory medium. For example, component 140 may store, via non-volatile memory medium 340, firmware 346B. At 535, second data may be provided to the component via the first bus. For example, BMC 130 may provide second data to component 140 via bus 310.

At 540, based at least on the second data, provide a second signal to the non-volatile memory medium, the multiplexer, and the integrated circuit, in which the second signal may cause the integrated circuit to be released from the reset state, may cause the write protection of the non-volatile memory medium to be instated, and may cause the multiplexer to couple the non-volatile memory medium to the integrated circuit. For example, based at least on the second data, bridge 320 may provide a second signal to the non-volatile memory medium, the multiplexer, and the integrated circuit, in which the second signal may cause the integrated circuit to be released from the reset state, may cause the write protection of the non-volatile memory medium to be instated, and may cause the multiplexer to couple the non-volatile memory medium to the integrated circuit. At 545, the firmware may be executed. For example, IC 360 may execute firmware 346B.

Figure 6:
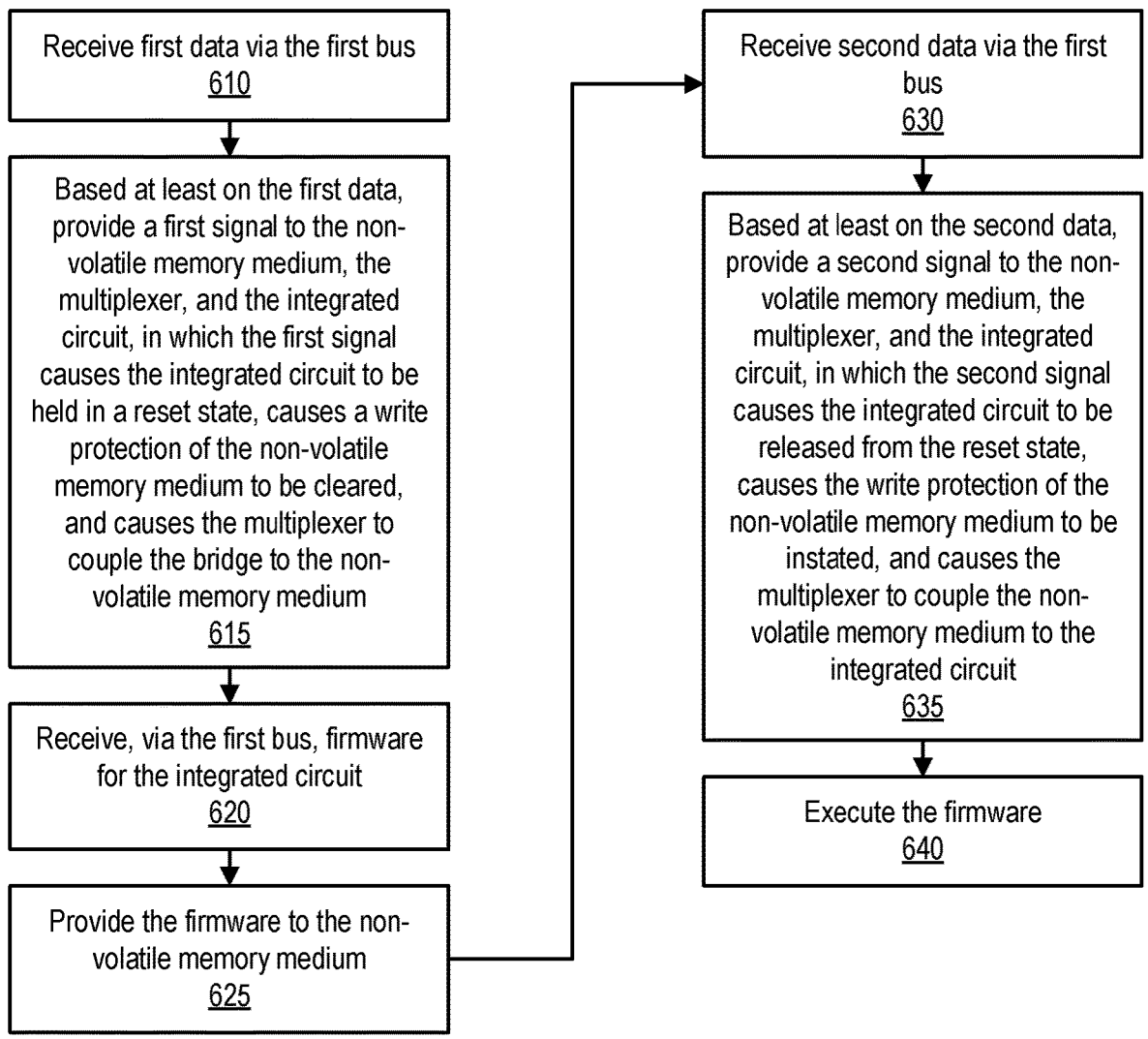
FIG. 6 illustrates an example of a method of operating a component configured to be utilized by an information handling system, according to one or more embodiments.

Turning now to FIG. 6, an example of a method of operating a component of an information handling system is illustrated, according to one or more embodiments. At 610, first data may be received via a first bus. For example, bridge 320 may receive first data. For example, bridge 320 may receive first data via bus 310.

At 615, based at least on the first data, a first signal may be provided to the non-volatile memory medium, the multiplexer, and the integrated circuit, in which the first signal may cause the integrated circuit to be held in a reset state, may cause a write protection of the non-volatile memory medium to be cleared, and may cause the multiplexer to couple the bridge to the non-volatile memory medium. For example, based at least on the first data, bridge 320 may provide a first signal to non-volatile memory medium 340, multiplexer 350, and integrated circuit 360, in which the first signal may cause integrated circuit 360 to be held in a reset state, may cause a write protection of non-volatile memory medium 340 to be cleared, and may cause multiplexer 350 to couple bridge 320 to non-volatile memory medium 340.

At 620, firmware for the integrated circuit may be received via the first bus. For example, bridge 320 may receive, via bus 310, firmware 346B for IC 360. At 625, the firmware may be provided to the non-volatile memory medium. For example, bridge 320 may provide firmware 346B to non-volatile memory medium 340. For instance, bridge 320 may provide firmware 346B to non-volatile memory medium 340 via bus 330.

At 630, second data may be received via the first bus. For example, bridge 320 may receive second data via bus 310. At 635, based at least on the second data, a second signal may be provided to the non-volatile memory medium, the multiplexer, and the integrated circuit, in which the second signal may cause the integrated circuit to be released from the reset state, may cause the write protection of the non-volatile memory medium to be instated, and may cause the multiplexer to couple the non-volatile memory medium to the integrated circuit. For example, based at least on the second data, bridge 320 may provide a second signal to non-volatile memory medium 340, multiplexer 350, and IC 360, in which the second signal may cause IC 360 to be released from the reset state, may cause the write protection of non-volatile memory medium 340 to be instated, and may cause multiplexer 350 to couple non-volatile memory medium 340 to IC 360. At 640, the firmware may be executed. For example, IC 360 may execute firmware 346B. In one or more embodiments, IC 360 may be configured to execute firmware 346B.

Figure 7:
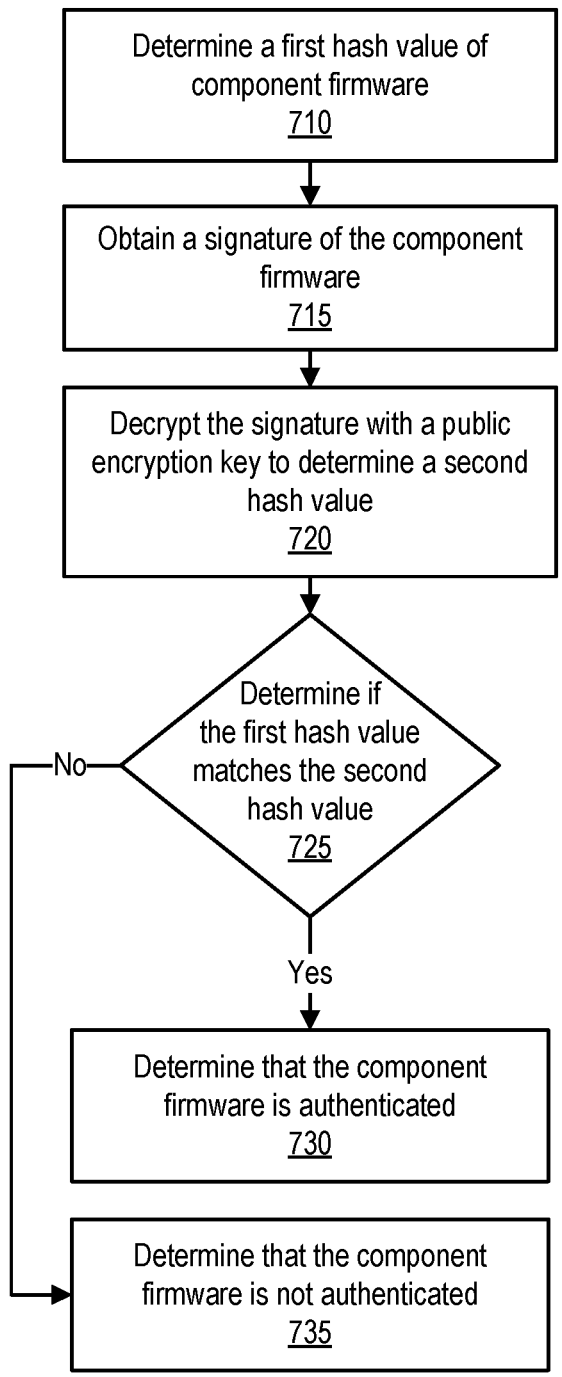
FIG. 7 illustrates an example of a method of authenticating firmware, according to one or more embodiments.

Turning now to FIG. 7, an example of a method of authenticating firmware is illustrated, according to one or more embodiments. At 710, a first hash value of component firmware may be determined. For example, BMC 130 may determine a first hash value of firmware 346. For instance, BMC 130 may utilize firmware 346 as input to a one-way hash function to determine the first hash value of firmware 346.

In one or more embodiments, a one-way hash function may be considered collision free. For example, the one-way hash function may be injective or one-to-one. For instance, h($z_1$) and h($z_2$) may produce different values, where inputs $z_1$ and $z_2$ are different. In one or more embodiments, a one-way hash function may be considered a cryptographic checksum, a message digest, a digital fingerprint, a message integrity check, a contraction function, a compression function, and/or a manipulation detection code, among others. Examples of one-way hash functions may include one or more of an Abreast Davies-Meyer, a Davies-Meyer, a message digest (MD) 2, a MD 4, a MD 5, a RIPE-MD, a GOST Hash, a N-HASH, a HAVAL, a SHA (secure hash algorithm) (e.g., SHA-1, SHA-2, SHA-3, SHA-256, SHA-384, etc.), and a SNEFRU, among others. In one or more embodiments, a one-way hash function may be a composite function of two or more one-way hash functions. For example, a function $h_1$ may include a MD 5 one-way hash function $h_2$, a SHA one-way hash function $h_3$, and a MD 5 one-way hash function $h_4$, such that $h_1 = h_2(h_3(h_4(z)))$. For instance, a one-way hash function that is a composite function of two or more one-way hash functions may be considered to be and/or said to be strengthened.

At 715, a signature of the component firmware may be obtained. For example, BMC 130 may obtain signature 348 of firmware 346 from non-volatile memory medium 340. At 720, the signature may be decrypted with a public encryption key to determine a second hash value. For example, BMC 130 may decrypt signature 348 with public encryption key 279 to determine or obtain a second hash value. For instance, a hash value of firmware 346 may have been encrypted with a private encryption key to produce signature 348. In one or more embodiments, the private encryption key utilized to produce signature 348 may be associated with public encryption key 279. The private encryption key may be different from public encryption key 279. For example, the private encryption key and public encryption key 279 may be asymmetric encryption keys. In one instance, data encrypted via the private encryption key may be decrypted via public encryption key 279. In another instance, data encrypted via public encryption key 279 may be decrypted via the private encryption key.

At 725, it may be determined if the first hash value matches the second hash value. For example, BMC 130 may determine if the first hash value matches the second hash value. If the first hash value matches the second hash value, it may be determined that the component firmware is authenticated, at 730. For example, if the first hash value matches the second hash value, BMC 130 may determine that the component firmware (e.g., firmware 346) is authenticated. If the first hash value does not match the second hash value, it may be determined that the component firmware is not authenticated, at 735. For example, if the first hash value does not match the second hash value, BMC 130 may determine that the component firmware (e.g., firmware 346) is not authenticated.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a first bus;
   a component that includes a communications bridge, a non-volatile memory medium, a multiplexer, and an integrated circuit; and
   a baseboard management controller (BMC);
   wherein the component and the BMC are coupled to the first bus;
   wherein the BMC includes a processor and a memory medium, coupled to the processor, that stores instructions executable by the processor, which when executed by the processor, cause BMC to:
     determine to provide firmware to the component; and
     provide first data to the component via a first bus;
   wherein the component is configured to:
     based at least on the first data, provide, by the communications bridge, a first signal to the non-volatile memory medium, the multiplexer, and the integrated circuit, wherein the first signal causes the integrated circuit to be held in a reset state, causes a write protection of the non-volatile memory medium to be cleared, and causes the multiplexer to couple the BMC to the non-volatile memory medium;
   wherein the instructions further cause the BMC to:
     provide the firmware to the non-volatile memory medium via the multiplexer;
   wherein the component is further configured to:
     store, via the non-volatile memory medium, the firmware;
   wherein the instructions further cause the BMC to:
     provide second data to the component via the first bus; and
   wherein the component is further configured to:
     based at least on the second data, provide, via the communications bridge, a second signal to the non-volatile memory medium, the multiplexer, and the integrated circuit, wherein the second signal causes the integrated circuit to be released from the reset state, causes the write protection of the non-volatile memory medium to be instated, and causes the multiplexer to couple the non-volatile memory medium to the integrated circuit; and
     execute, via the integrated circuit, the firmware.

2. The information handling system of claim 1,
   wherein the instructions further cause the BMC to:
     after the information handling system boots, provide third data to the component via the first bus;
   wherein the component is further configured to:
     based at least on the third data, provide, via the communications bridge, a third signal to the non-volatile memory medium, the multiplexer, and the integrated circuit, wherein the third signal causes the integrated circuit to be held in the reset state, causes the write protection of the non-volatile memory medium to be cleared, and causes the multiplexer to couple the BMC to the non-volatile memory medium;

wherein the instructions further cause the BMC to:
receive the firmware from the non-volatile memory medium;
determine a first hash value from the firmware;
decrypt a signature associated with the firmware to obtain a second hash value; and
determine that the first hash value matches the second hash value.

3. The information handling system of claim 1, wherein, to decrypt the signature associated with the firmware to obtain the second hash value, the instructions further cause the BMC to decrypt the signature with a public encryption key.

4. The method of claim 3, wherein the instructions further cause the BMC to:
obtain the public encryption key from a certificate signed by a certificate authority.

5. The information handling system of claim 1,
wherein the communications bridge is coupled to the first bus and is coupled to a second bus;
wherein the multiplexor is coupled to the second bus;
wherein the first bus utilizes a first protocol; and
wherein the second bus utilizes a second protocol, different from the first protocol.

6. The method of claim 5,
wherein the first bus includes an inter-integrated circuit bus; and
wherein the second bus includes a serial peripheral interface bus.

7. The information handling system of claim 1, wherein a Peripheral Component Interconnect Express coupling includes the first bus.

8. A method, comprising:
determining, by a baseboard management controller (BMC) of an information handling system, to provide firmware to a component of the information handling system;
providing, by the BMC, first data to the component via a first bus;
based at least on the first data, providing, by a communications bridge of the component, a first signal to a non-volatile memory medium of the component, a multiplexer of the component, and an integrated circuit of the component, wherein the first signal causes the integrated circuit to be held in a reset state, causes a write protection of the non-volatile memory medium of the component to be cleared, and causes the multiplexer of the component to couple the BMC to the non-volatile memory medium;
providing, by the BMC, the firmware to the non-volatile memory medium via the multiplexer;
storing, by the non-volatile memory medium, the firmware;
providing, by the BMC, second data to the component via the first bus;
based at least on the second data, providing, by the communications bridge, a second signal to the non-volatile memory medium of the component, the multiplexer of the component, and the integrated circuit, wherein the second signal causes the integrated circuit to be released from the reset state, causes the write protection of the non-volatile memory medium of the component to be instated, and causes the multiplexer of the component to couple the non-volatile memory medium to the integrated circuit; and
executing, by the integrated circuit, the firmware.

9. The method of claim 8, further comprising:
booting the information handling system;
after the booting the information handling system, providing, by the BMC, third data to the component via the first bus;
based at least on the third data, providing, by the communications bridge, a third signal to the non-volatile memory medium of the component, the multiplexer of the component, and the integrated circuit of the component, wherein the third signal causes the integrated circuit to be held in the reset state, causes the write protection of the non-volatile memory medium of the component to be cleared, and causes the multiplexer of the component to couple the BMC to the non-volatile memory medium;
receiving, by the BMC, the firmware from the non-volatile memory medium;
determining, by the BMC, a first hash value from the firmware;
decrypting, by the BMC, a signature associated with the firmware to obtain a second hash value; and
determining, by the BMC, that the first hash value matches the second hash value.

10. The method of claim 9, wherein the decrypting, by the BMC, the signature associated with the firmware to obtain the second hash value includes decrypting the signature with a public encryption key.

11. The method of claim 10, further comprising:
obtaining, by the BMC, the public encryption key from a certificate signed by a certificate authority.

12. The method of claim 8,
wherein the communications bridge is coupled to the first bus and is coupled to a second bus;
wherein the multiplexor is coupled to the second bus;
wherein the first bus utilizes a first protocol; and
wherein the second bus utilizes a second protocol, different from the first protocol.

13. The method of claim 12,
wherein the first bus includes an inter-integrated circuit bus; and
wherein the second bus includes a serial peripheral interface bus.

14. The method of claim 8, wherein a Peripheral Component Interconnect Express coupling includes the first bus.

15. A component, configured to be installed in an information handling system, comprising:
a communications bridge configured to be coupled to a first bus of the information handling system;
a non-volatile memory medium;
an integrated circuit; and
a multiplexer, coupled to the communications bridge, the non-volatile memory medium, and the integrated circuit;
wherein the communications bridge is further configured to:
receive first data via the first bus;
based at least on the first data, provide a first signal to the non-volatile memory medium, the multiplexer, and the integrated circuit, wherein the first signal causes the integrated circuit to be held in a reset state, causes a write protection of the non-volatile memory medium to be cleared, and causes the multiplexer to couple the communications bridge to the non-volatile memory medium;

receive, via the first bus, firmware for the integrated circuit;

provide the firmware to the non-volatile memory medium;

receive second data via the first bus; and based at least on the second data, provide a second signal to the non-volatile memory medium, the multiplexer, and the integrated circuit, wherein the second signal causes the integrated circuit to be released from the reset state, causes the write protection of the non-volatile memory medium to be instated, and causes the multiplexer to couple the non-volatile memory medium to the integrated circuit; and wherein the integrated circuit is configured to execute the firmware.

16. The component of claim 15, further comprising:

a second bus;

wherein the second bus couples the communications bridge to the multiplexer.

17. The component of claim 16, wherein the first bus utilizes a first protocol;

wherein the second bus utilizes a second protocol, different from the first protocol.

18. The component of claim 17, wherein the first bus includes an inter-integrated circuit bus; and wherein the second bus includes a serial peripheral interface bus.

19. The component of claim 15, wherein the component is a Peripheral Component Interconnect Express component.

20. The component of claim 19, wherein the Peripheral Component Interconnect Express component is coupled to the information handling system via a Peripheral Component Interconnect Express coupling; and wherein the Peripheral Component Interconnect Express coupling includes the first bus.

* * * * *